(12) United States Patent
Kakinuma

(10) Patent No.: US 9,621,763 B2
(45) Date of Patent: Apr. 11, 2017

(54) IMAGE PROCESSING APPARATUS, IMAGE PROCESSING SYSTEM, IMAGE PROCESSING METHOD, AND RECORDING MEDIUM CONVERTING GRADATION OF IMAGE DATA IN GRADATION CONVERSION RANGE TO EMPHASIZE OR REDUCE SHINE APPEARANCE

(71) Applicant: Akihiro Kakinuma, Kanagawa (JP)

(72) Inventor: Akihiro Kakinuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/906,639

(22) PCT Filed: Aug. 5, 2014

(86) PCT No.: PCT/JP2014/071139
§ 371 (c)(1),
(2) Date: Jan. 21, 2016

(87) PCT Pub. No.: WO2015/056481
PCT Pub. Date: Apr. 23, 2015

(65) Prior Publication Data
US 2016/0165095 A1   Jun. 9, 2016

(30) Foreign Application Priority Data

Oct. 18, 2013  (JP) ................................. 2013-217517

(51) Int. Cl.
*H04N 1/407* (2006.01)
*H04N 1/60* (2006.01)
(Continued)

(52) U.S. Cl.
CPC ....... *H04N 1/4072* (2013.01); *G06K 15/1872* (2013.01); *G06T 5/009* (2013.01); *H04N 1/6027* (2013.01)

(58) Field of Classification Search
None
See application file for complete search history.

(56) References Cited

U.S. PATENT DOCUMENTS

| 4,984,071 A | * | 1/1991 | Yonezawa | G06T 5/009 |
| | | | | 358/521 |
| 5,053,888 A | * | 10/1991 | Nomura | H04N 1/4074 |
| | | | | 358/3.22 |

(Continued)

FOREIGN PATENT DOCUMENTS

| JP | 2005-010902 | 1/2005 |
| JP | 2006-352601 | * 12/2006 |

(Continued)

OTHER PUBLICATIONS

International Search Report Issued on Oct. 14, 2014 in PCT/JP2014/071139 filed on Aug. 5, 2014.
Extended European Search Report dated Oct. 18, 2016.

*Primary Examiner* — Scott A Rogers
(74) *Attorney, Agent, or Firm* — IPUSA, PLLC

(57) ABSTRACT

An image processing apparatus includes an image information acquisition unit acquiring average brightness of image data and cumulative frequency distribution of pixels related to gradation of the image data; a conversion range determination unit acquiring a conversion threshold value from the average brightness based on a previously set relationship and determining a gradation conversion range where the gradation of the image data is to be converted based on a gradation where a cumulative frequency corresponds to the conversion threshold value in the cumulative frequency distribution; and a gradation conversion unit converting the gradation of the image data in the gradation conversion range.

18 Claims, 16 Drawing Sheets

(51) Int. Cl.
*G06T 5/00* (2006.01)
*G06K 15/02* (2006.01)

(56) References Cited

U.S. PATENT DOCUMENTS

| | | | | |
|---|---|---|---|---|
| 5,117,293 | A * | 5/1992 | Asada | H04N 1/6027 358/2.1 |
| 5,289,282 | A | 2/1994 | Tsuji et al. | |
| 5,323,241 | A * | 6/1994 | Yonezawa | H04N 1/6027 347/254 |
| 6,504,668 | B1 * | 1/2003 | Takeuchi | G11B 5/59627 360/77.04 |
| 7,199,840 | B2 * | 4/2007 | Shiota | G06T 5/009 348/672 |
| 7,613,338 | B2 * | 11/2009 | Yano | G06T 5/008 345/589 |
| 8,526,729 | B2 * | 9/2013 | Mitsunaga | H04N 1/6027 382/167 |
| 2005/0013503 | A1 | 1/2005 | Park et al. | |
| 2006/0056684 | A1 * | 3/2006 | Kurane | G06T 5/009 382/162 |
| 2006/0119713 | A1 | 6/2006 | Deguchi et al. | |
| 2008/0240605 | A1 * | 10/2008 | Enjuji | G06T 5/009 382/274 |
| 2013/0135336 | A1 | 5/2013 | Kakinuma | |
| 2015/0332653 | A1 | 11/2015 | Kakinuma | |

FOREIGN PATENT DOCUMENTS

| | | |
|---|---|---|
| JP | 2007-201655 | 8/2007 |
| JP | 2008-061031 | 3/2008 |
| JP | 2009-116611 | 5/2009 |
| JP | 2010-147895 | 7/2010 |
| JP | 2010-183416 | 8/2010 |

\* cited by examiner

IMAGE PROCESSING APPARATUS, IMAGE PROCESSING SYSTEM, IMAGE PROCESSING METHOD, AND RECORDING MEDIUM CONVERTING GRADATION OF IMAGE DATA IN GRADATION CONVERSION RANGE TO EMPHASIZE OR REDUCE SHINE APPEARANCE

TECHNICAL FIELD

The present invention relates to an image processing apparatus, an image processing system, an image processing method, and a recording medium.

BACKGROUND ART

Digital image data captured by a digital camera and acquired by reading a picture and the like using a scanner (hereinafter referred to as "image data") are variously used as, for example, an output from various types of printers to a recording sheet, etc., and a display to a plurality of monitors connected via the Internet Such image data are output to a recording sheet, a display, etc., in a visible manner. In some applications, a higher image quality is desired in an output result of the image data. Especially, when image data are output in a commercial application, it is desired that an intended image expression is reproduced on a recording sheet or on a monitor to obtain a higher image quality so that the output result can attract a viewer and appeal to the viewer's emotion.

The high image quality can be formed by complicatedly combining various elements such as clear colors, deep (solid) black color, good graininess, good sharpness, etc. To that end, in order to obtain such high image quality, a high technology is required to adequately adjust various parameters such as contrast, hue, color balance and the like in accordance with the image data. Therefore, a complicated operation may be necessary, which is based on instinct and experience of an operator who performs the image processing.

One aspect of image processing that requires a higher technique is to emphasize or reduce the shine of an object to be imaged having a mirror surface that reflects light, such as a metal or glass. For example, by emphasizing the shine appearance of a vehicle, a watch, a noble metal, a jewel, a dish, pottery, etc., it becomes possible to strengthen the brightness and improve the texture of those objects. On the other hand, for example, by reducing the shine appearance of a glass surface, a water surface, etc., it becomes possible to reduce excessive reflected light by those surfaces, etc., to emphasize a main object to be imaged.

As an example of such an image processing method, there is a proposed method in which by determining gradation change characteristics based on highlight values in and outside a designated area of an image and changing the number of pixels in the designated area, it becomes possible to reproduce a realistic texture of an object including highlight light such metallic luster (see, for example, Patent Document 1). According to the image processing method of Patent Document 1, it becomes possible to perform image processing without the need for complicated operations which rely on an operator's experience.

SUMMARY OF THE INVENTION

Problems to be Solved by the Invention

However, in the image processing method of Patent Document 1, it is necessary for an operator to designate at least one area in an image. When an operator designates the area, the area is designated so that the area includes an object that includes highlight light. However, if there are many such objects in the image, the number of the areas to be designated is accordingly increased, which may increase the workload of the operator.

The present invention is made in light of the problem, and an object of the present invention is to provide an image processing apparatus that can easily process a shine appearance of an image while reducing the workload.

Means for Solving the Problems

According to an aspect of the present invention, an image processing apparatus includes: an image information acquisition unit acquiring average brightness of image data and cumulative frequency distribution of pixels related to gradation of the image data; a conversion range determination unit acquiring a conversion threshold value from the average brightness based on a previously set relationship and determining a gradation conversion range where the gradation of the image data is to be converted based on a gradation where a cumulative frequency corresponds to the conversion threshold value in the cumulative frequency distribution; and a gradation conversion unit converting the gradation of the image data in the gradation conversion range.

Effects of the Present Invention

According to an aspect of the present invention, it may become possible to provide an image processing apparatus that can easily process a shine appearance of an image while reducing the workload.

BEST MODE FOR CARRYING OUT THE INVENTION

Figure 1:
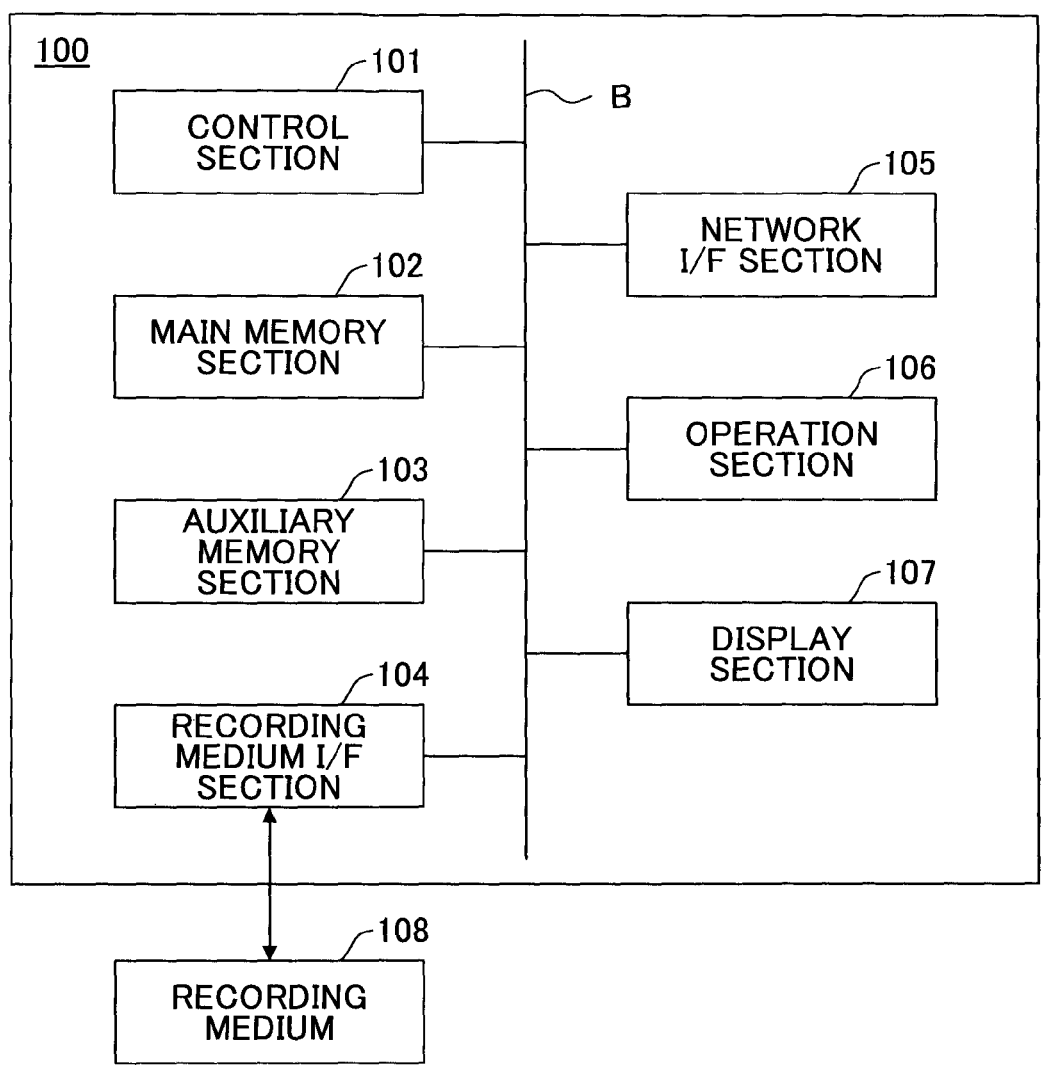
FIG. 1 is a drawing illustrating an example hardware configuration of an image processing apparatus according to a first embodiment.

In the following, embodiments of the present invention are described with reference to the accompanying drawings. Throughout the figures, the same reference numerals are used to describe the same elements and the repeated descriptions thereof may be omitted.

First Embodiment

Hardware Configuration of an Image Processing Apparatus

FIG. 1 illustrates an example hardware configuration of an image processing apparatus 100 according to a first embodiment.

As illustrated in FIG. 1, the image processing apparatus 100 includes a control section 101, a main memory section 102, an auxiliary memory section 103, a recording medium I/F section 104, a network I/F section 105, an operation section 106, and a display section 107, which are connected to each other via a bus B.

The control section 101 is a Central Processing Unit (CPU) that controls sections and performs calculations and processing on data. Further, the control section 101 is an arithmetic device that executes a program stored in the main memory section 102, so as to receive data from an input device or a storage device, calculate and perform a process on the data, and output the calculated and processed data to an output device, a storage device, etc.

The main memory section 102 is a Read Only Memory (ROM) and a Random Access Memory (RAM) or the like serving as a storage device that stores or temporarily stores data and programs that are executed by the control section 101, the programs including an Operating System (OS), application software programs, etc.

The recording medium I/F section 104 is an interface between the image processing apparatus 100 and a recording medium 108 such as, for example, a flash memory that is connected to the image processing apparatus 100 via a data transmission path such as a Universal Serial Bus (USB) or the like. Further, a program stored in the recording medium 108 is installed into the image processing apparatus 100 via the recording medium I/F section 104 so as to be executed by the control section 101.

The network I/F section 105 is an interface between the image processing apparatus 100 and a peripheral device connected to the image processing apparatus 100 via a network such as a Local Area Network (LAN), a Wide Area Network (WAN) or the like that are formed of wireless and/or wired data transmission paths.

The operation section 106 is, for example, key switches formed of hard keys and a mouse.

Figure 2:
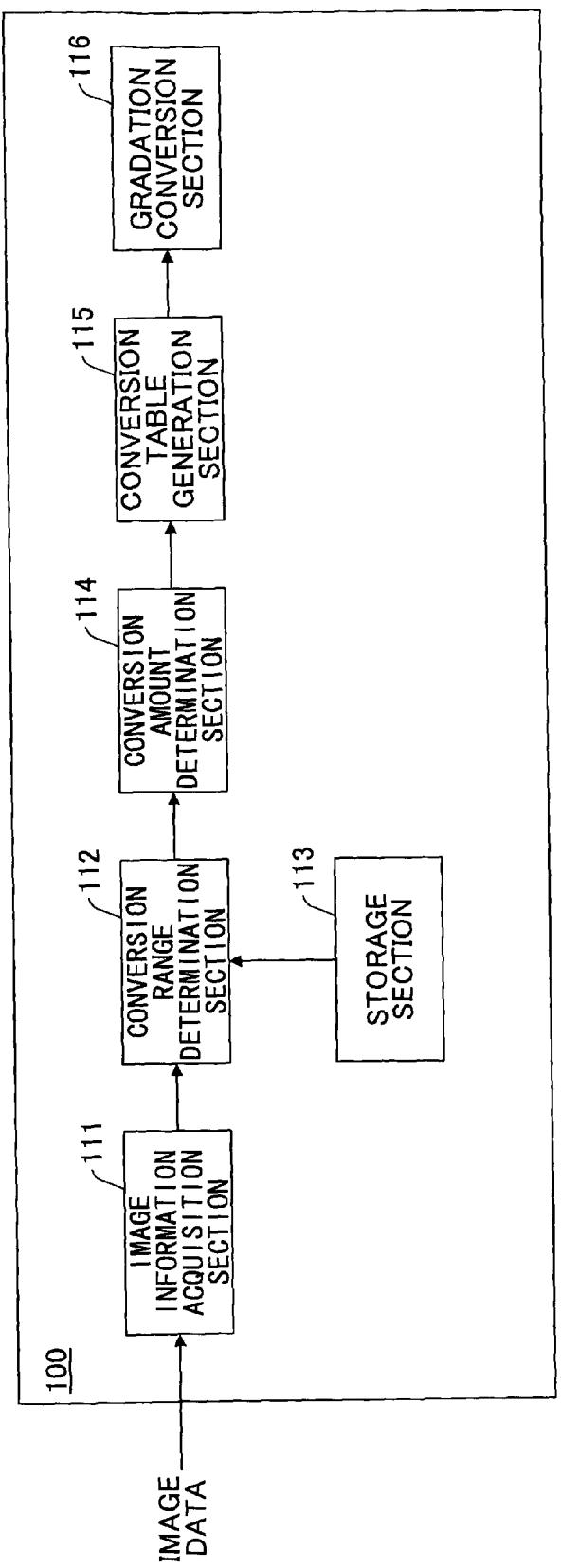
FIG. 2 is a drawing illustrating an example functional configuration of the image processing apparatus according to the first embodiment.

The display section 107 is, for example, a crystal or organic EL display to display an image, operational icons, etc., so as to serve as a user interface for various settings when a user uses the functions of the image processing apparatus 100. Functional configuration of an image processing apparatus FIG. 2 illustrates an example functional configuration of the image processing apparatus 100 according to the first embodiment.

The image processing apparatus 100 performs image processing of emphasizing or reducing the shine on input image data by functioning as the sections described below. As illustrated in FIG. 2, the image processing apparatus 100 according to the first embodiment includes an image information acquisition section 111, a conversion range determination section 112, a storage section 113, a conversion amount determination section 114, a conversion table generation section 115, and a gradation conversion section 116.

The image information acquisition section 111, the conversion range determination section 112, the conversion amount determination section 114, the conversion table generation section 115, and the gradation conversion section 116 are functions that can be realized by executing a program by the control section 101, the program being stored in the main memory section 102 or the like. The storage section 113 is the function that is realized by the main memory section 102 and the auxiliary memory section 103.

Figure 3:
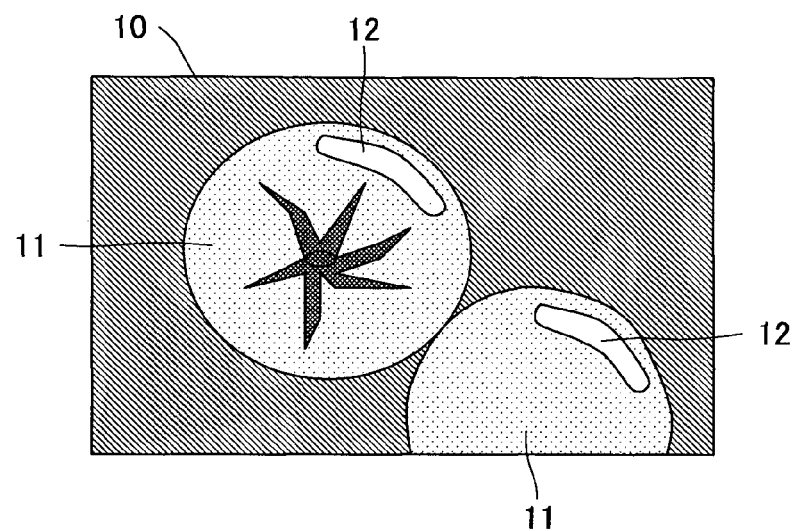
FIG. 3 is a drawing illustrating example image data.

FIG. 3 is a drawing of an example image data 10 to be input into the image processing apparatus 100. The image data 10 include two tomatoes 11 having respective shine areas 12 formed on the surfaces of the tomatoes 11.

In the following, processing contents of the respective functional sections when the image data 10 of FIG. 3 are input into the image processing apparatus 100 are described.
Image information acquisition When the image data 10 are input into the image processing apparatus 100, the image information acquisition section 111 acquires the gradation distribution and average brightness "Yave" of the image data 10.

Figure 4:
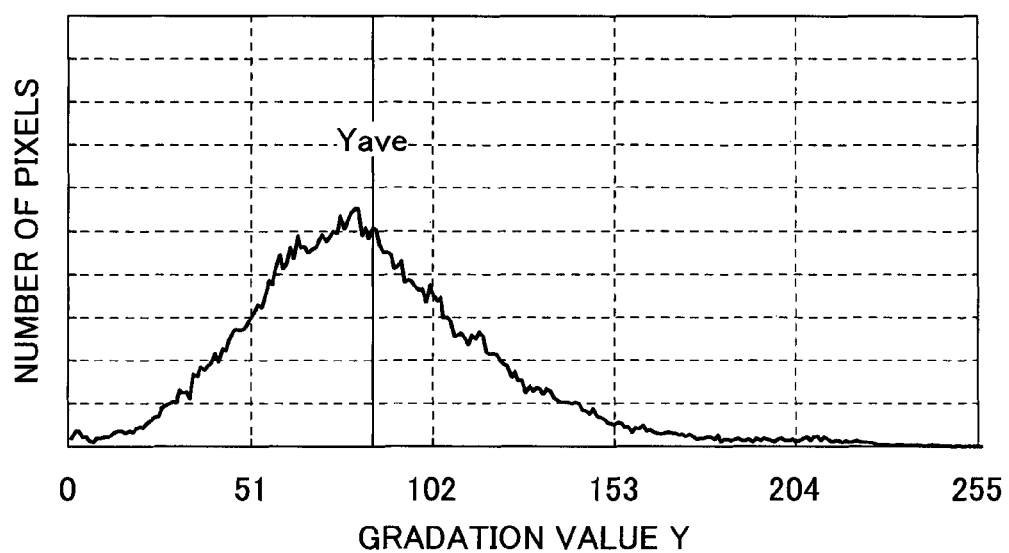
FIG. 4 is a drawing illustrating examples of gradation distribution and average brightness of the image data of FIG. 3.

FIG. 4 is a graph illustrating the gradation distribution of the image data 10 in FIG. 3. The gradation distribution is a frequency distribution indicating the number of pixels relative to a gradation value "Y" (0 to 255 in case of 8 bits) of the image data 10. The gradation value "Y" may be obtained based on, for example, a conversion formula to a gray scale Y=0.299R+0.587G+0.114B. The average brightness "Yave" refers to an average value of the gradation values "Y" of all the pixels included in the image data 10.

Figure 5A:
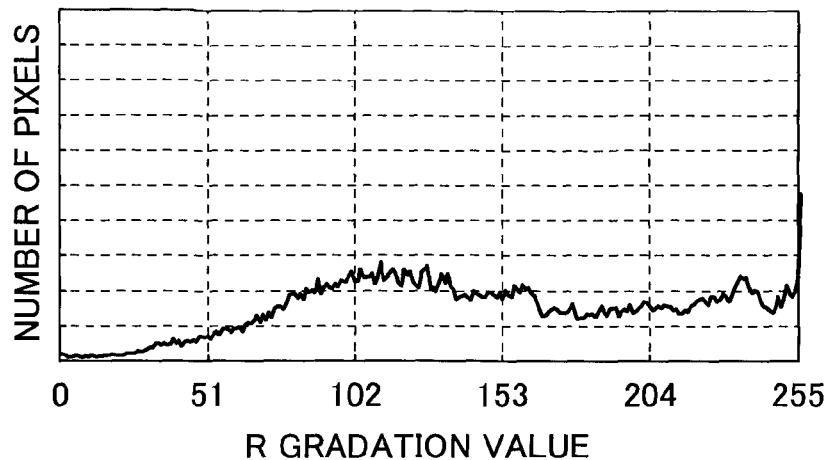
FIGS. 5A through 5C are drawings illustrating examples of RGB gradation distributions, respectively, of the image data.
Figure 5B:
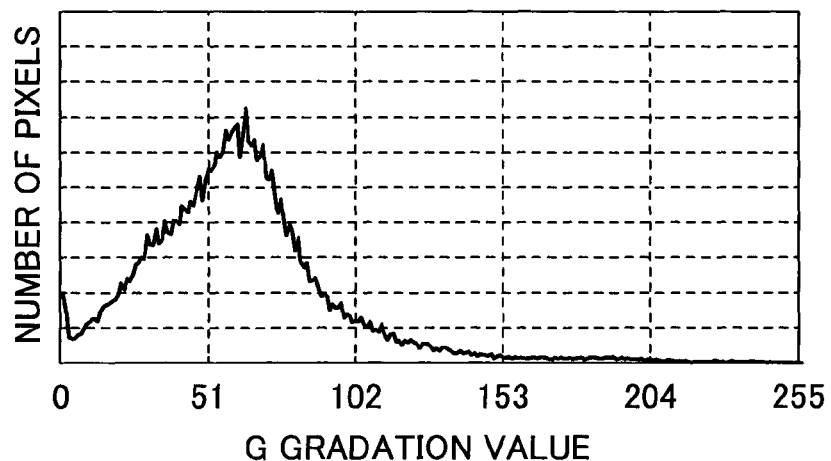
Figure 5C:
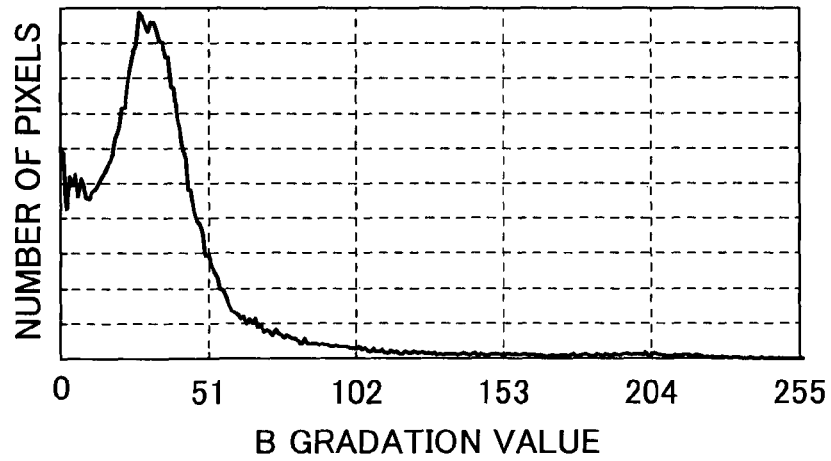
Figure 6A:
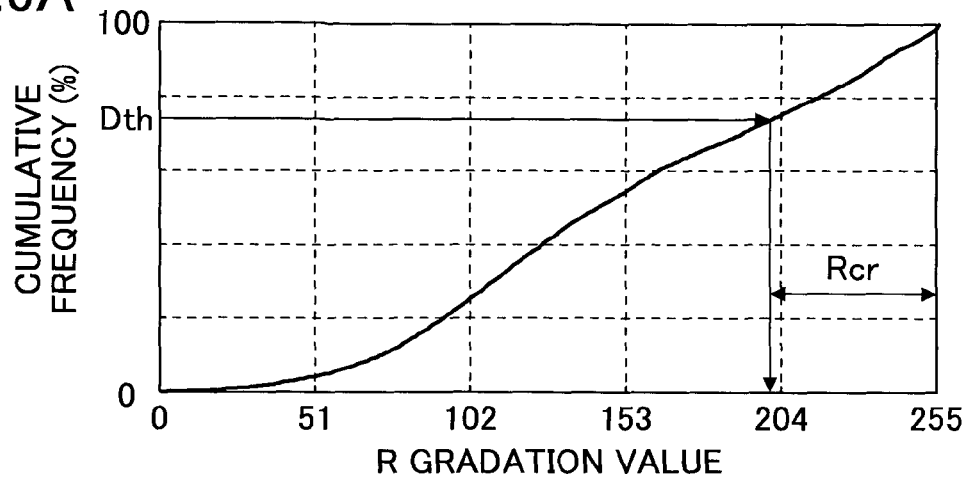
FIGS. 6A through 6C are drawings illustrating examples of RGB cumulative frequency distributions of gradation values, respectively.
Figure 6B:
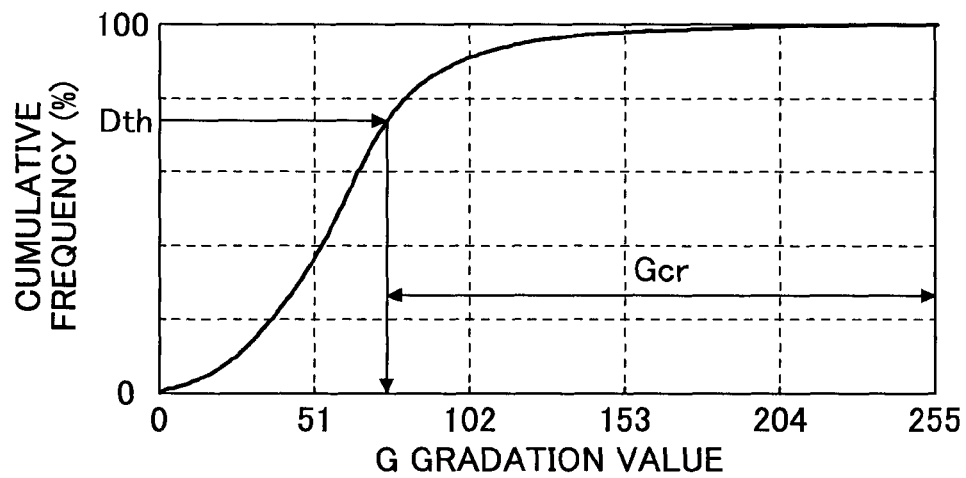
Figure 6C:
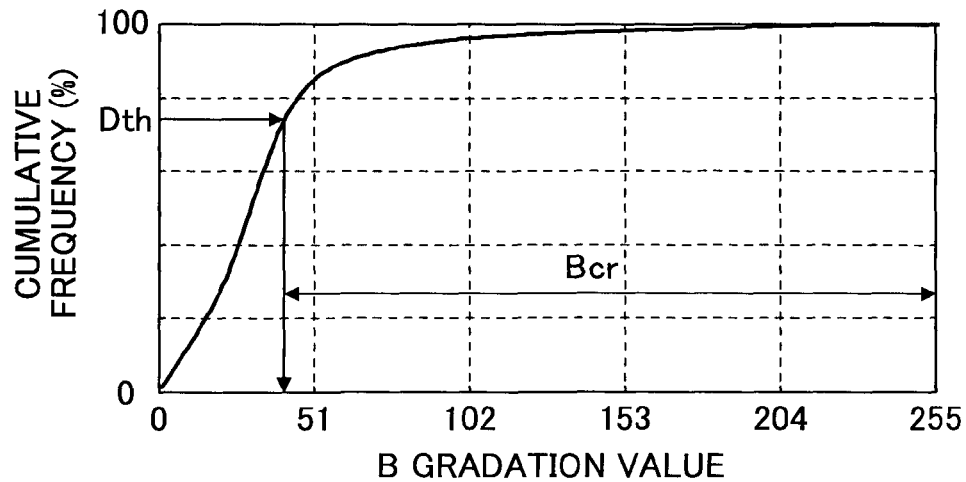

Further, the image information acquisition section 111 acquires a gradation distribution of each of RGB (hereinafter may be referred to as "RGB gradation distributions") and a cumulative frequency distribution of the gradation value for each of RGB (hereinafter may be referred to as "RGB cumulative frequency distributions") of the image data 10. FIGS. 5A through 5C illustrate a R gradation distribution, a G gradation distribution, and a B gradation distribution, respectively, of the image data 10 in FIG. 3. Further, FIGS. 6A through 6C illustrate a R gradation cumulative frequency distribution, a G gradation cumulative frequency distribution, and a B gradation cumulative frequency distribution, respectively, of the image data 10 in FIG. 3. In each of the RGB gradation cumulative frequency distributions, the values are normalized so that the cumulative frequency (value) of the maximum gradation value (255 in a case of 8 bits) is 100%.

Determination of Gradation Conversion Range

After the image information acquisition section 111 acquires the average brightness "Yave", RGB gradation distributions, and the RGB cumulative frequency distributions of the image data 10, the conversion range determination section 112 reads conversion information for acquiring a conversion threshold value "Dth" based on the average brightness "Yave" from the storage section 113. The conversion information refers to a relationship between the average brightness "Yave" of the image data 10 and the conversion threshold value "Dth" and is set and stored in the storage section 113 in advance.

The conversion threshold value "Dth" is the value indicating a gradation lower limit value in the shine area 12 of the image data 10, so that a range where the cumulative frequencies are greater than or equal to the conversion threshold value "Dth" in a gradation cumulative frequency distribution for each of RGB (hereinafter may be referred to as "RGB gradation cumulative frequency distributions") is determined as a gradation conversion range.

Figure 7:
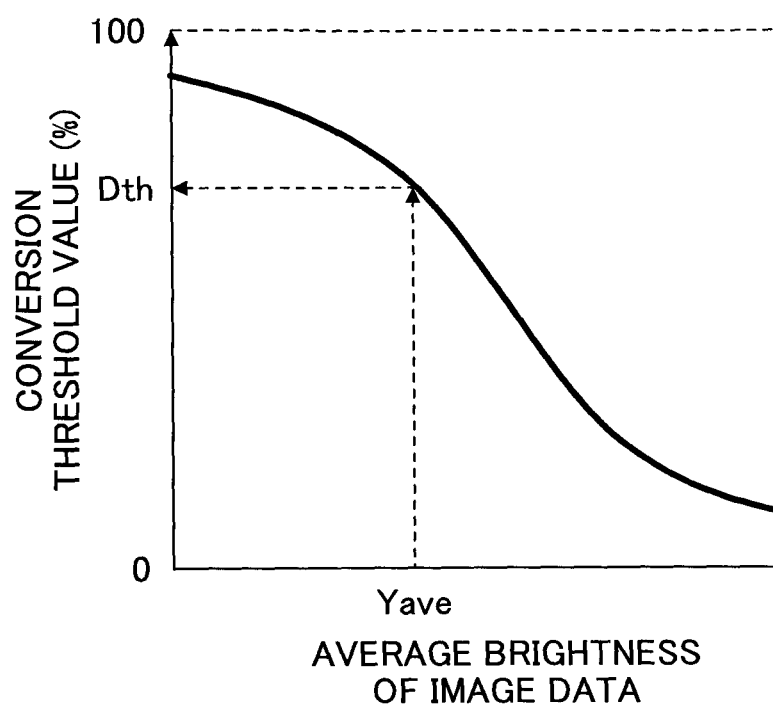
FIG. 7 is a drawing illustrating an example of conversion information indicating a relationship between the average brightness and a conversion threshold value.

FIG. 7 illustrates an example of the conversion information indicating the relationship between the average brightness "Yave" and the conversion threshold value "Dth".

The conversion information is obtained on an empirical basis from experiments and set in advance. For example, as illustrated in FIG. 7, the conversion information is in a manner such that the conversion threshold value "Dth" is continuously reduced as the average brightness "Yave" increases. Therefore, according to the example of FIG. 7, in the image data 10, the greater the shine area 12 and the greater the average brightness "Yave" is, the lesser the conversion threshold value "Dth" becomes and the wider the set gradation conversion range becomes.

The conversion range determination section 112 acquires the conversion threshold value "Dth" from the average brightness "Yave" of the image data 10, which is acquired by the image information acquisition section 111, based on the conversion information exemplarily illustrated in FIG. 7. Next, the conversion range determination section 112 determines the ranges, where the RGB gradation values are greater than or equal to the respective gradation values where the cumulative frequencies are the conversion threshold value "Dth", as the gradation conversion ranges (hereinafter may be referred to as an "R gradation conversion range "Rcr"", a "G gradation conversion range "Gcr"", and a "B gradation conversion range "Bcr"" or collectively referred to as RGB gradation conversion ranges) where the gradation (values) of the image data 10 are to be converted.

The gradation conversion ranges correspond to gradation ranges of the shine area 12 in the image data 10, and are automatically determined from the average brightness "Yave" of the image data 1 based on the conversion information.

Determination of a Gradation Conversion Amount

When the conversion range determination section 112 determines the RGB gradation conversion ranges (i.e., the R gradation conversion range "Rcr", the "G gradation conversion range "Gcr", and the B gradation conversion range "Bcr"), the conversion amount determination section 114 determines gradation conversion amounts in the RGB gradation conversion ranges "Rcr", "Gcr", and "Bcr".

The gradation conversion amounts are used to increase or decrease input gradation values in the center values of the RGB gradation conversion ranges "Rcr", "Gcr", and "Bcr" of the image data 10. The conversion amount determination section 114 determines the gradation conversion amounts in a manner such that, for example, the lesser the RGB gradation conversion ranges "Rcr", "Gcr", and "Bcr" are, the lesser the gradation conversion amounts become, and the greater the RGB gradation conversion ranges "Rcr", "Gcr", and "Bcr" are, the greater the gradation conversion amounts become. By determining the gradation conversion amounts by the conversion amount determination section 114 in this way, it becomes possible to prevent, for example, occurrences of saturation in a high-brightness area and a gradation inversion area after the gradations are converted.

The conversion amount determination section 114 automatically determines RGB gradation conversion amounts "ΔRmax", "ΔGmax", and "ΔBmax" based on the sizes (values) of the RGB gradation conversion ranges "Rcr", "Gcr", and "Bcr", respectively.

Generation of a Gradation Conversion Table

After the conversion amount determination section 114 determines the RGB gradation conversion amounts "ΔRmax", "ΔGmax", and "ΔBmax", the conversion table generation section 115 generates RGB gradation conversion tables. The RGB gradation conversion tables indicate relationships between RGB input gradation values and the corresponding RGB output gradation values, which are the values after the RGB input gradation values are converted, of the image data 10. The RGB gradation conversion tables are generated based on the respective RGB gradation conversion ranges "Rcr", "Gcr", and "Bcr" and the RGB gradation conversion amounts "ΔRmax", "ΔGmax", and "ΔBmax".

Figure 8A:
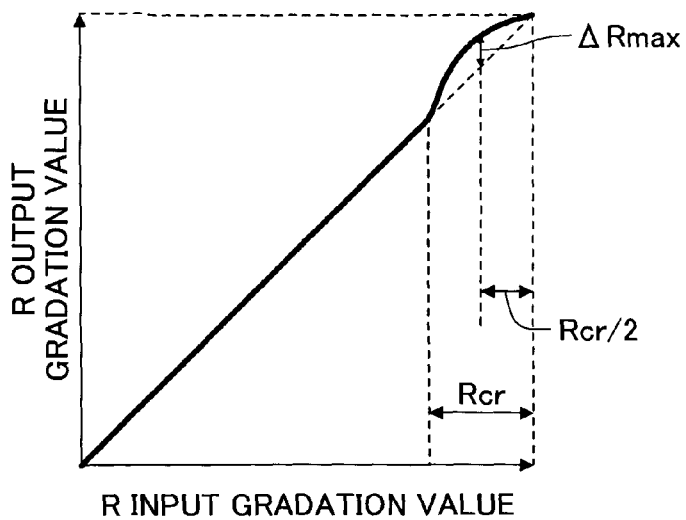
FIGS. 8A through 8C are drawings illustrating respective examples of gradation conversion tables when shine is emphasized.
Figure 8B:
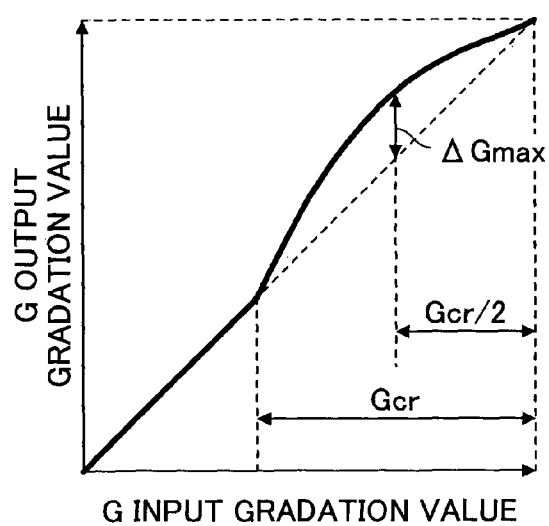
Figure 8C:
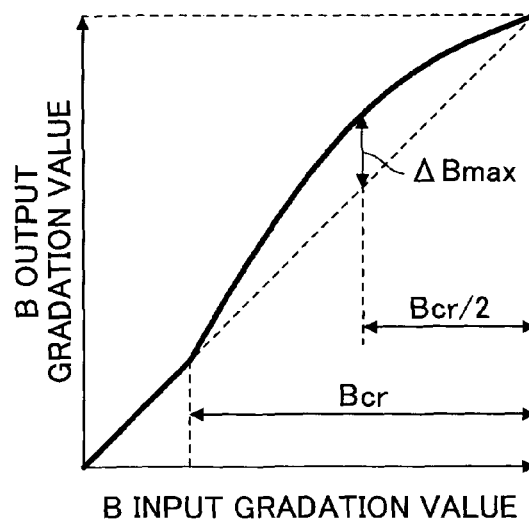

FIGS. 8A through 8C illustrate examples of an R gradation conversion table, a G gradation conversion table, and a B gradation conversion table, respectively, when the shine appearance of the shine area 12 of the image data 10 is to be emphasized.

When the shine appearance is to be emphasized, the conversion table generation section 115 generates the RGB conversion tables in a manner such that the RGB output gradation values are greater than the respective RGB input gradation values in the RGB gradation conversion ranges in the image data 10 and the differences between the RGB output gradation values and the respective RGB input gradation values are equal to the RGB gradation conversion amounts at the center values in the RGB gradation conversion ranges.

Here, the slopes of the curved lines representing the relationships between the RGB input gradation values and the respective RGB output gradation values in the RGB gradation conversion tables are set in a manner such that the slopes continuously change across the entire gradation areas without being discontinuously changed in the boundaries between the RGB gradation conversion ranges and the other gradation ranges. Further, the RGB gradation conversion tables are set in a manner such that, with the increase of the RGB input gradation values from the minimum value to the maximum value (0 to 255 in a case of 8 bits), the respective RGB output gradation values are continuously increased. By setting in this way, it becomes possible to prevent occurrence of an image defect due to a false contour or the like caused by the discontinuity of the gradation or the gradation inversion after image processing.

The conversion table generation section 115 generates the RGB conversion tables based on the respective RGB gradation conversion ranges "Rcr", "Gcr", and "Bcr", which are determined by the conversion range determination section 112, the RGB gradation conversion amounts "ΔRmax", "ΔGmax", and "ΔBmax", which are determined by the conversion amount determination section 114, and the above settings.

Figure 9A:
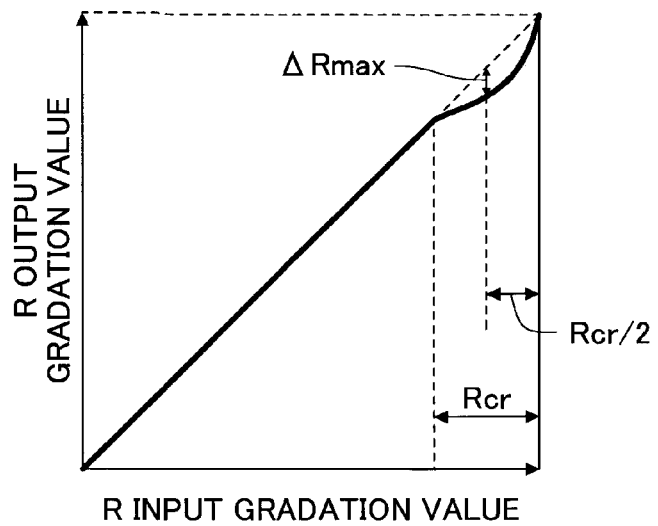
FIGS. 9A through 9C are drawings illustrating respective examples of gradation conversion tables when shine is reduced.
Figure 9B:
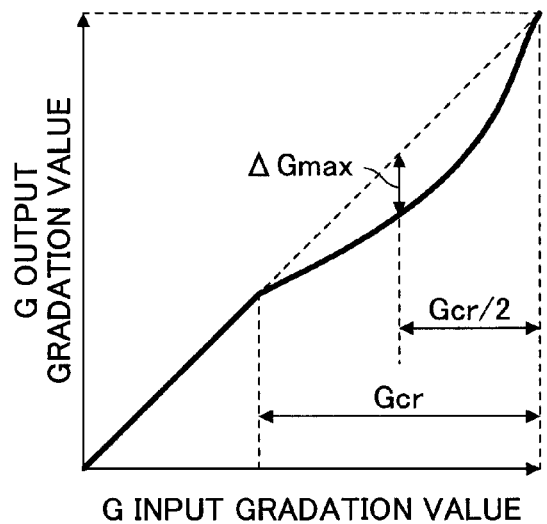
Figure 9C:
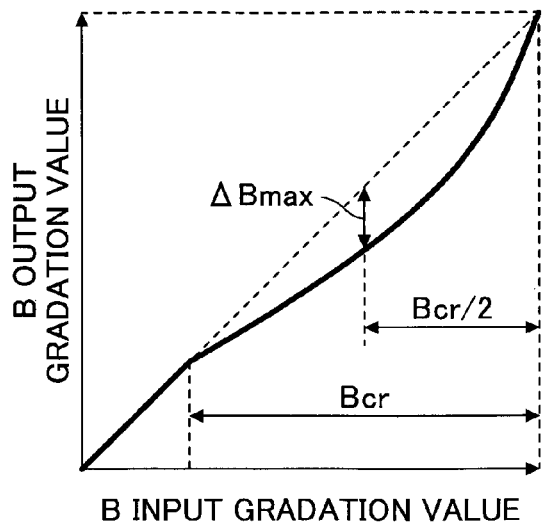

FIGS. 9A through 9C illustrate examples of the R gradation conversion table, the G gradation conversion table, and the B gradation conversion table, respectively, when the shine appearance of the shine area 12 of the image data 10 is to be reduced.

When the shine appearance is to be reduced, the conversion table generation section 115 generates the RGB conversion tables in a manner such that the RGB output gradation values are less than the respective RGB input gradation values in the RGB gradation conversion ranges in the image data 10 and the differences between the RGB output gradation values and the respective RGB input gradation values are equal to the RGB gradation conversion amounts at the center values in the RGB gradation conversion ranges.

Even when shine appearance is to be reduced, the slopes of the curved lines representing the relationships between the RGB input gradation values and the respective RGB output gradation values in the RGB gradation conversion tables are set in a manner such that the slopes continuously change across the entire gradation areas, and, with the increase of the RGB input gradation values, the respective RGB output gradation values are continuously increased as well. By setting in this way, it becomes possible to prevent occurrence of an image defect due to a false contour or the like caused by the discontinuity of the gradation or the gradation inversion in an image after image processing.

Here, it should be noted that any other method of generating the RGB gradation conversion tables may be used when, for example, the discontinuity of the gradation and the gradation inversion do not occur in the image data 10 after the conversion. Further, any method may be used to switch whether to emphasize or reduce the shine appearance of the shine area 12 in the image data 10. For example, when the image data 10 are input, the selection whether to emphasize or reduce the shine appearance from the operation section 106 and the display section 107 may be accepted. Otherwise, a shine amount of an object to be imaged is detected from the input image data 10, and whether to emphasize or reduce the shine appearance may be determined based on the detected shine amount.

Gradation Conversion Process

After the conversion table generation section 115 generates the RGB conversion tables, the gradation conversion section 116 performs a gradation conversion process on the RGB image data 10 based on the respective RGB gradation conversion tables. By the gradation conversion process by the gradation conversion section 116, the shine appearance of the shine area 12 in the image data 10 is emphasized or reduced.

The image data 10 on which the gradation conversion process is performed by the gradation conversion section 116 are displayed on, for example, the display section 107 so that an operator who performs the image processing can review the processing result.

In a Case of Different Image Data

Here, imaging processing is described in a case where image data having a high brightness area different from an area of the image data 10 are input.

Figure 10:
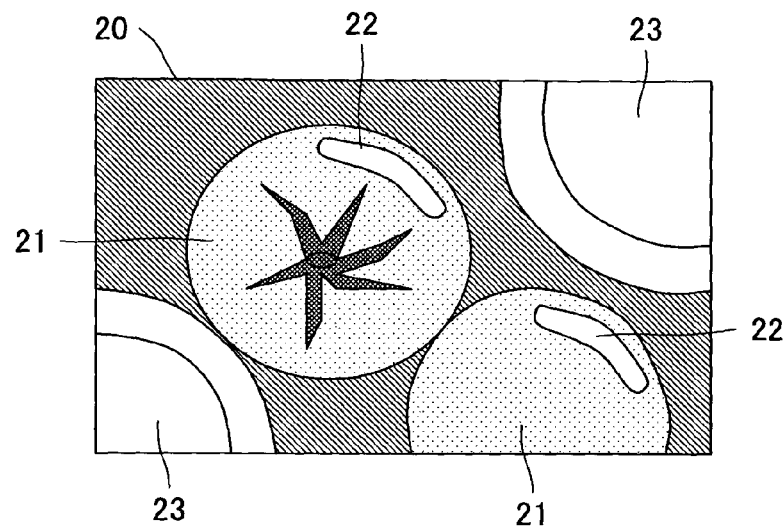
FIG. 10 is a drawing illustrating another example of image data.

FIG. 10 is a drawing illustrating an example of image data 20 which is different from the image data 10 example. The image data 20 include not only the two tomatoes 21 but also two white dishes 23 as additional objects to be imaged. Namely, besides those two white dishes 23, the image data 20 are the same as the image data 10. In the image data 20, due to the existence of those two white dishes 23, highlight areas different from shine areas 22 are formed.

Figure 11:
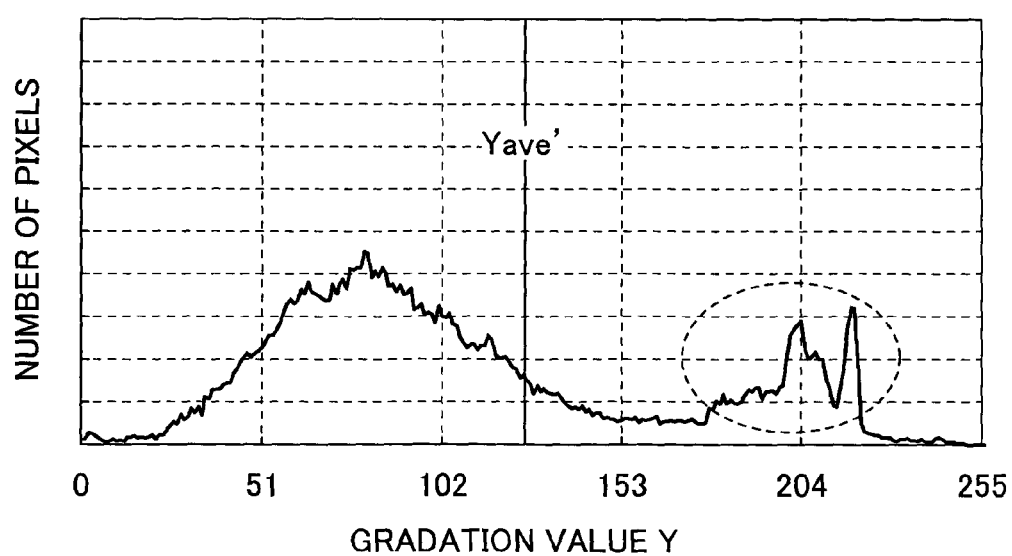
FIG. 11 is a drawing illustrating examples of the gradation distribution and the average brightness of the image data of FIG. 10.

FIG. 11 illustrates the gradation distribution and the average brightness "Yave'" of the image data 20 which are acquired by the image information acquisition section 111.

In the image data 20, due to the additional highlight areas of the white dishes 23 to the image data 10, the numbers of pixels on the high brightness side are increased (see a dotted-line circle in FIG. 11). Further, the average brightness "Yave'" of the image data 20 is greater than the average brightness "Yave" of the image data 10.

Figure 12:
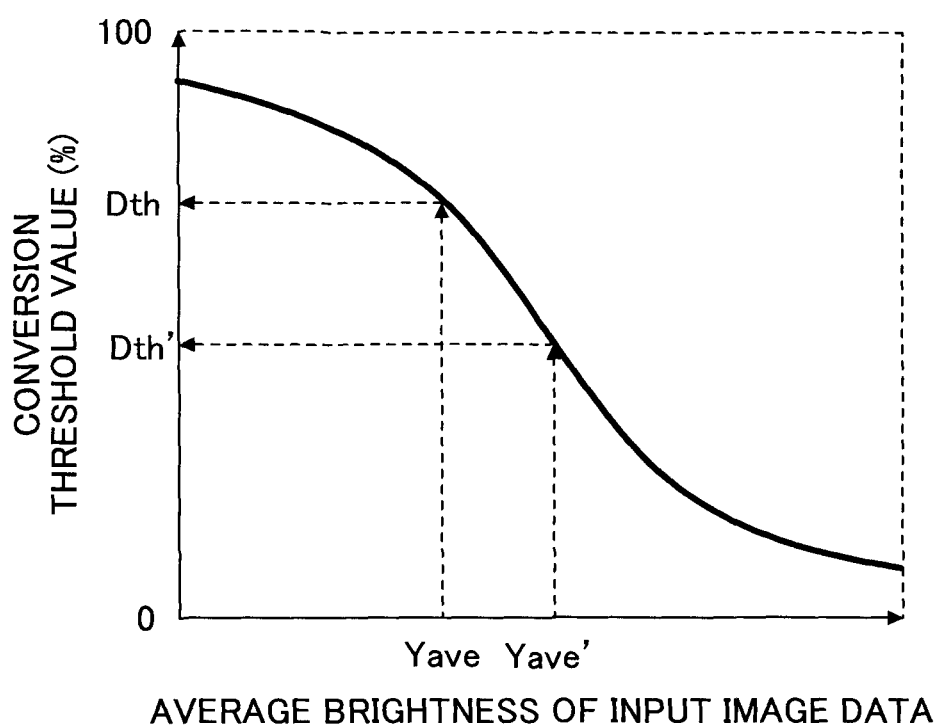
FIG. 12 is a drawing illustrating a difference in the conversion threshold value based on a difference in the average brightness of the image data.

As illustrated in FIG. 12, the conversion information, which is for acquiring the conversion threshold values "Dth" and "Dth'" from the average brightness "Yave" and "Yave'", respectively, by the conversion range determination section 112, is set in the manner such that the conversion threshold value "Dth'" continuously decreases as the average brightness "Yave'" increases similar to the case described above. Therefore, the conversion threshold value "Dth'" acquired from the average brightness "Yave'" of the image data 20 is less than the conversion threshold value "Dth" acquired from the average brightness "Yave" (<"Yave'") of the image data 10. When the conversion threshold value "Dth'" is small, it means that the number of pixels to which the conversion process is to be applied in the image 20 is increased.

Figure 13A:
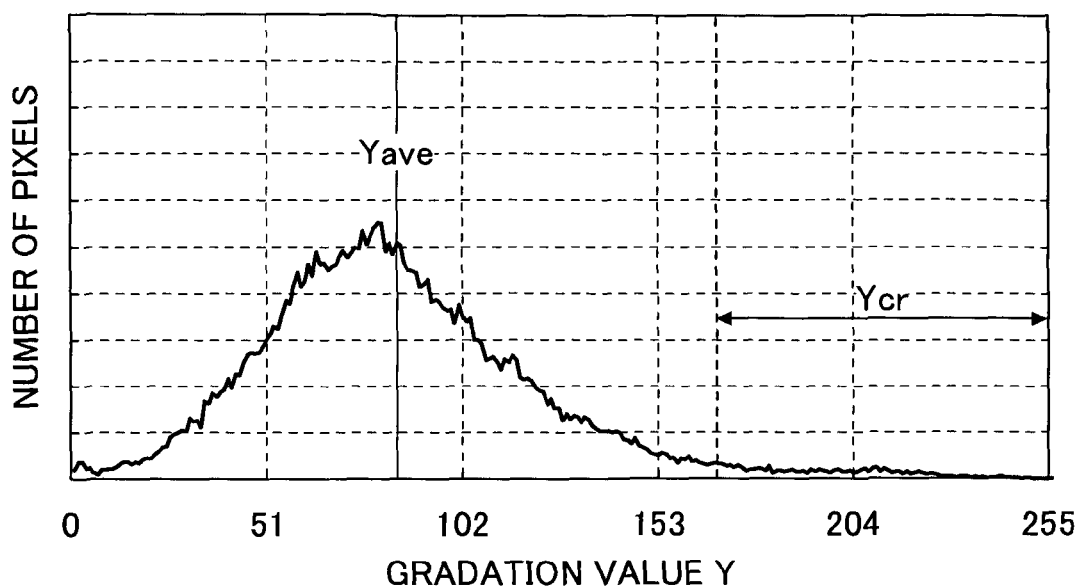
FIGS. 13A and 13B are drawings illustrating gradation change ranges of different image data.
Figure 13B:
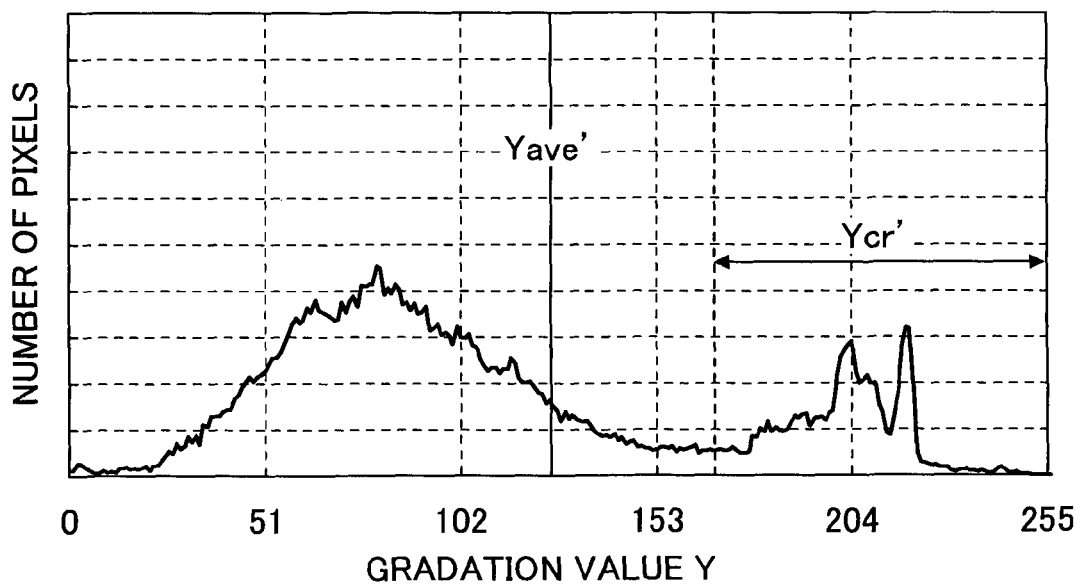

The conversion range determination section 112 determines the RGB gradation conversion ranges from the respective RGB cumulative frequency distributions of the RGB gradation values of the image data 20 based on the conversion threshold value "Dth'". FIGS. 13A and 13B illustrate the gradation conversion range "Ycr" of the image data 10 and the gradation conversion range "Ycr'" of the image data 20, respectively, which are determined by the conversion range determination section 112. Although the gradation conversion range is determined for each of RGB, FIGS. 13A and 13B illustrate the gradation conversion ranges corresponding to the respective gradation distributions of the image data 10 and 20.

As illustrated in FIGS. 13A and 13B, due to the additional highlight areas of the white dishes 23 in the image data 20, the number of the pixels on the high-brightness side in the image data 10 differs from the number of the pixels on the high-brightness side in the image data 20. However, it is understood that the gradation conversion range "Ycr" of the image data 10 and the gradation conversion range "Ycr'" of the image data 20 are in substantially the same gradation range. As described above, although the image data 20 differ from the image data 10 in that the highlight areas are added in the image data 20, the gradation conversion range "Ycr" of the image data 10 and the gradation conversion range "Ycr'" of the image data 20 are in substantially the same gradation range. Therefore, the same gradation conversion process is performed on the shine areas 12 and the shine areas 22 of the tomatoes 11 and 21, respectively, which are common between the image data 10 and 20.

As described above, in the image processing apparatus 100, the conversion information is set in a manner such that the gradation conversion ranges between two sets of image data having different sizes of the high-brightness areas are substantially the same as each other. As illustrated in FIGS.

7 and 12, the conversion information is set in a manner such that the conversion threshold value "Dth" is continuously decreased with the increase of the average brightness "Yave". Further, even when there are two sets of image data different from each other, the same gradation conversion process is performed on the shine areas similar to each other of the two sets of image data to emphasize or reduce the shine appearance.

Flow of the Image Processing

Figure 14:
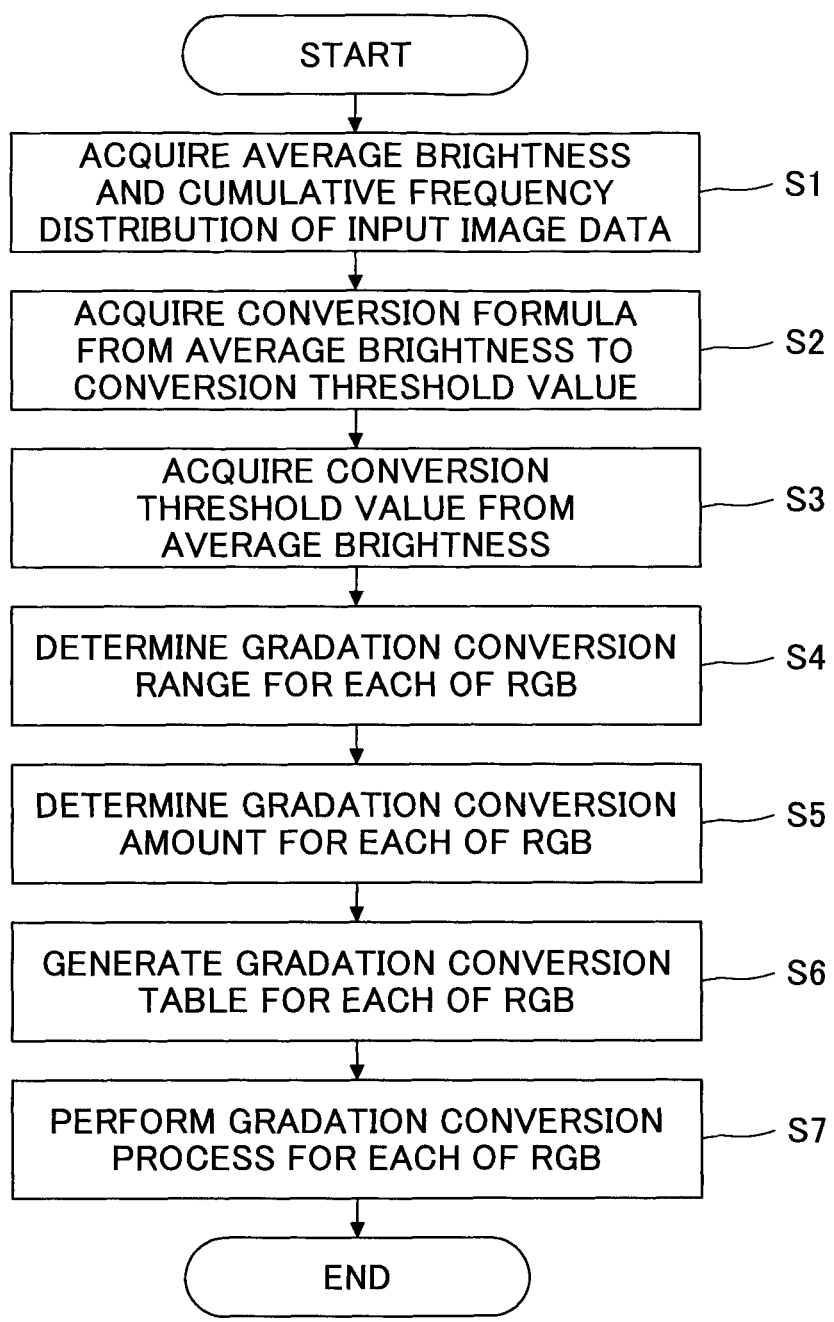
FIG. 14 is an example flowchart of an image processing according to the first embodiment.

FIG. 14 is a flowchart of an example image processing in the image processing apparatus 100 according to the first embodiment.

When image data are input into the image processing apparatus 100, first, in step S1, the image information acquisition section 111 acquires the average brightness "Yave" and the RGB cumulative frequency distributions of the respective RGB gradation values of the image data.

In step S2, the conversion range determination section 112 acquires the conversion information from the storage section 113, the conversion information being for acquiring the conversion threshold value "Dth" from the average brightness "Yave" of the image data. Next, in step S3, the conversion range determination section 112 acquires the conversion threshold value "Dth" from the average brightness "Yave" based on the conversion information. Further, in step S4, the conversion range determination section 112 determines the RGB gradation conversion ranges "Rcr", "Gcr", and "Bcr" which are the ranges of the respective RGB gradation values greater than or equal to the RGB gradation values corresponding to the RGB cumulative frequencies equal to the conversion threshold value "Dth" in the RGB cumulative frequency distributions of the RGB gradation values.

In step S5, the conversion amount determination section 114 determines the RGB gradation conversion amounts "ΔRmax", "ΔGmax", and "ΔBmax" based on the respective RGB gradation conversion ranges "Rcr", "Gcr", and "Bcr".

In step S6, the conversion table generation section 115 generates the RGB conversion tables based on the respective RGB gradation conversion ranges "Rcr", "Gcr", and "Bcr" and the RGB gradation conversion amounts "ΔRmax", "ΔGmax", and "ΔBmax".

Finally, in step S7, the gradation conversion section 116 performs the gradation conversion process on the RGB image data based on the generated RGB gradation conversion tables, respectively. Here, the gradation conversion section 116 may not perform the gradation conversion process on the ranges other than the RGB gradation conversion ranges "Rcr", "Gcr", and "Bcr".

After the output of image data on which the above image processing is performed, the image processing in the image processing apparatus 100 is finished.

As described above, in the image processing apparatus 100 according to the first embodiment, it is no longer necessary for an operator to perform operations such as the designation of the area where the image processing is to be performed, and the setting of the gradation conversion amounts in a computer, thereby reducing the workload, so that it becomes possible to easily perform the image processing of emphasizing and reducing the shine appearance of the image data.

Second Embodiment

Next, a second embodiment is described with reference to the accompanying drawings. Here, the repeated descriptions of the same elements and processes as those in the first embodiment may be omitted.

Configuration of the Image Processing System

Figure 15:
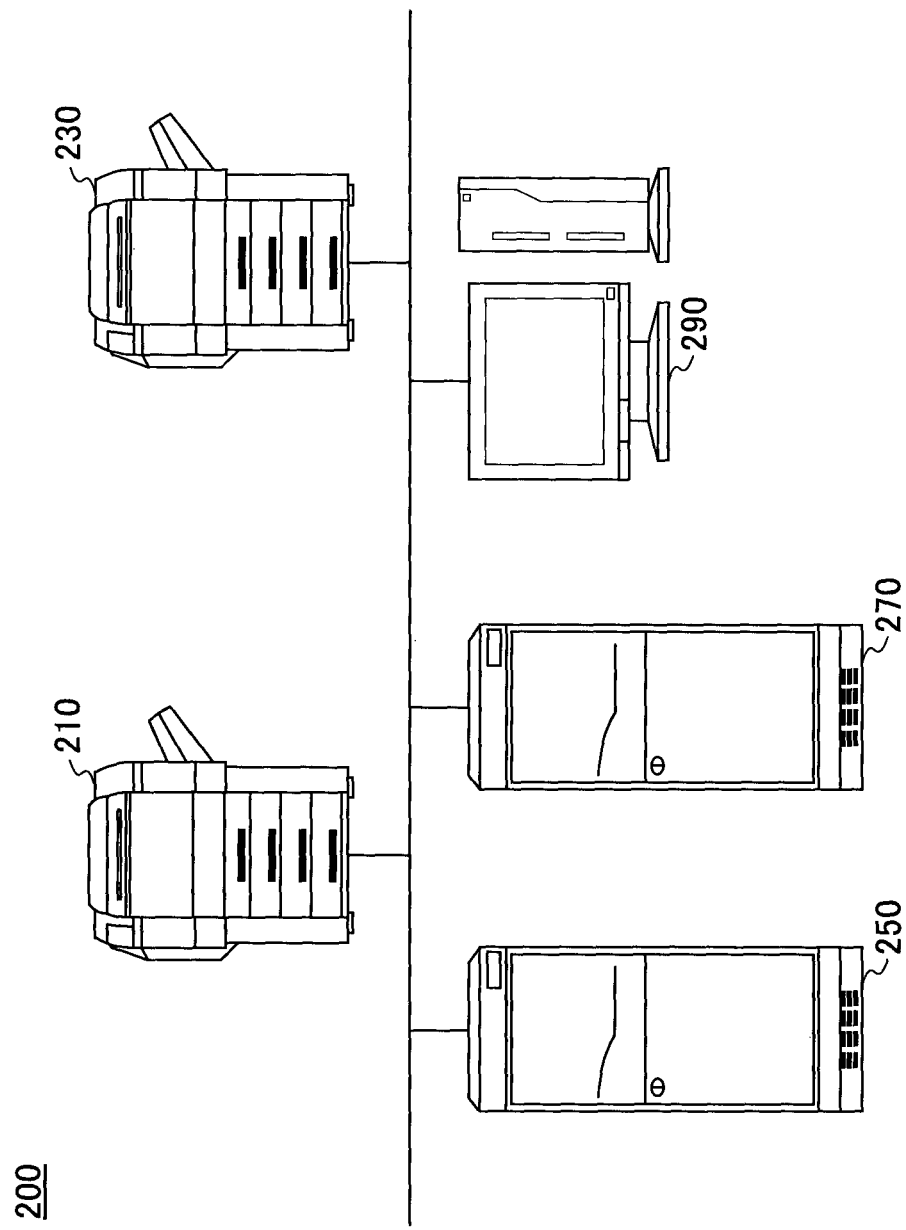
FIG. 15 is a drawing illustrating an example configuration of an image processing system according to a second embodiment.

FIG. 15 illustrates an example configuration of an image processing system 200 according to a second embodiment.

As illustrated in FIG. 15, the image processing system 200 includes Multifunction Peripherals (MFPs) 210 and 230, image processing servers 250 and 270, and an information processing terminal (e.g., Personal Computer (PC)) 290, which are connected via a network. Here, the numbers of the image processing servers and the information processing terminals may be arbitrary.

Each of the MFPs 210 and 230 includes the functions of a scanner, a copier, a printer, and a facsimile machine inside a single chassis thereof. The MFPs 210 and 230 perform a scanning process on a sheet medium using the scanning function thereof, generate image data, and transmit the image data to the image processing servers 250 and 270. Details of the MFPs 210 and 230 are described below.

The image processing servers 250 and 270 are examples of the image processing apparatus. The image processing servers 250 and 270 are computers such as work stations that receive the image data having been scanned by the MFPs 210 and 230 and the image data transmitted from another device that is connected thereto and perform an imaging process on the received image data. A function of the image processing servers 250 and 270 serving as the image processing apparatus may be integrated into at least one of the MFPs 210 and 230 and the information processing terminal 290.

Figure 16:
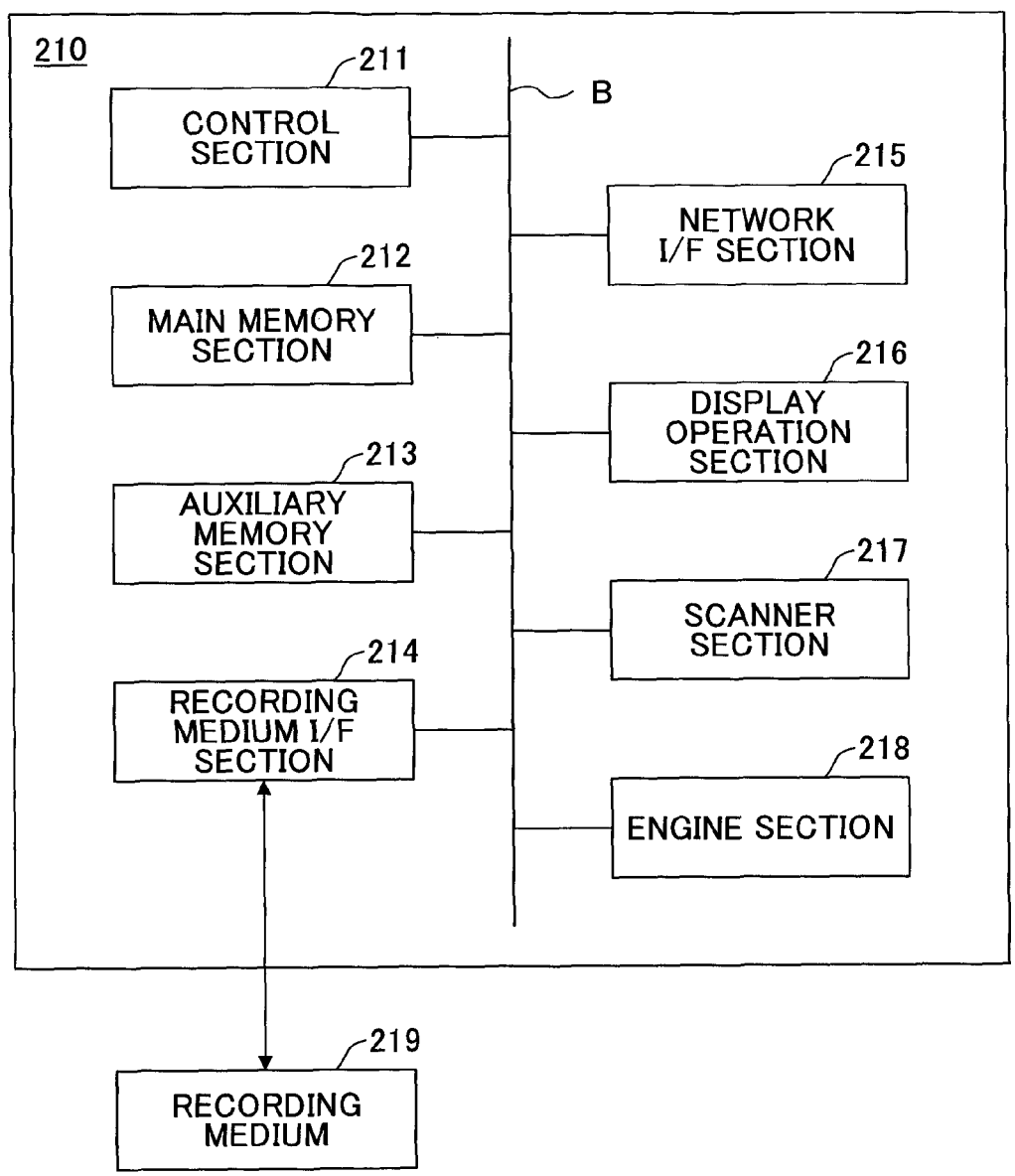
FIG. 16 is a drawing illustrating an example hardware configuration of an image processing apparatus according to the second embodiment.

FIG. 16 is a block diagram illustrating an example hardware configuration of the MFP 210. In this embodiment, it is assumed that the MFP 230 has the same hardware configuration as that of the MFP 210. However, the MFP 230 may have a hardware configuration different from that of the MFP 210.

As illustrated in FIG. 16, the MFP 210 includes a control section 211, a main memory section 212, an auxiliary memory section 213, a recording medium I/F section 214, a network I/F section 215, a display operation section 216, a scanner section 217, and an engine section 218.

The control section 211 is a CPU that controls devices and performs calculations and processing on data. Further, the control section 211 is an arithmetic device that executes a program stored in the main memory section 212, so as to receive data from an input device or a storage device, calculate and perform a process on the data, and output the calculated and processed data to an output device, a storage device, etc.

The main memory section 212 is a Read Only Memory (ROM) and a Random Access Memory (RAM) or the like serving as a storage device that stores or temporarily stores data and programs that are executed by the control section 211, the programs including an Operating System (OS), application software programs, etc.

The auxiliary memory section 213 is a Hard. Disk Drive (HDD) or the like serving as a storage device storing data related to the application software programs.

The recording medium I/F section 214 is an interface between the MFP 210 and a recording medium 219 such as, for example, a flash memory that is connected to the MFP 210 via a data transmission path such as USB or the like. Further, a program stored in the recording medium 219 is installed into the MFP 210 via the recording medium I/F section 214 so as to be executed by the control section 211.

The network I/F section 215 is an interface between the MFP 210 and a peripheral device connected to the MFP 210 via a network such as a LAN, a WAN or the like that is formed of wireless and/or wired data transmission paths.

The display operation section 216 includes, for example, key switches and a Liquid Crystal Display (LCD) having a touch panel function, and serves as a User Interface (UI) when using a function of the MFP 210.

The scanner section 217 is a scanner device that scans a sheet medium or the like for reading the image formed thereon, so as to acquire the image data. The engine section 218 is a mechanical part of the plotter and the like to perform an image forming process.

Here, the image processing system 200 may include a device that can acquire image data such as a scanner, a facsimile machine, a copier or the like in place of the MFP (Multifunction Peripheral) 210.

Figure 17:
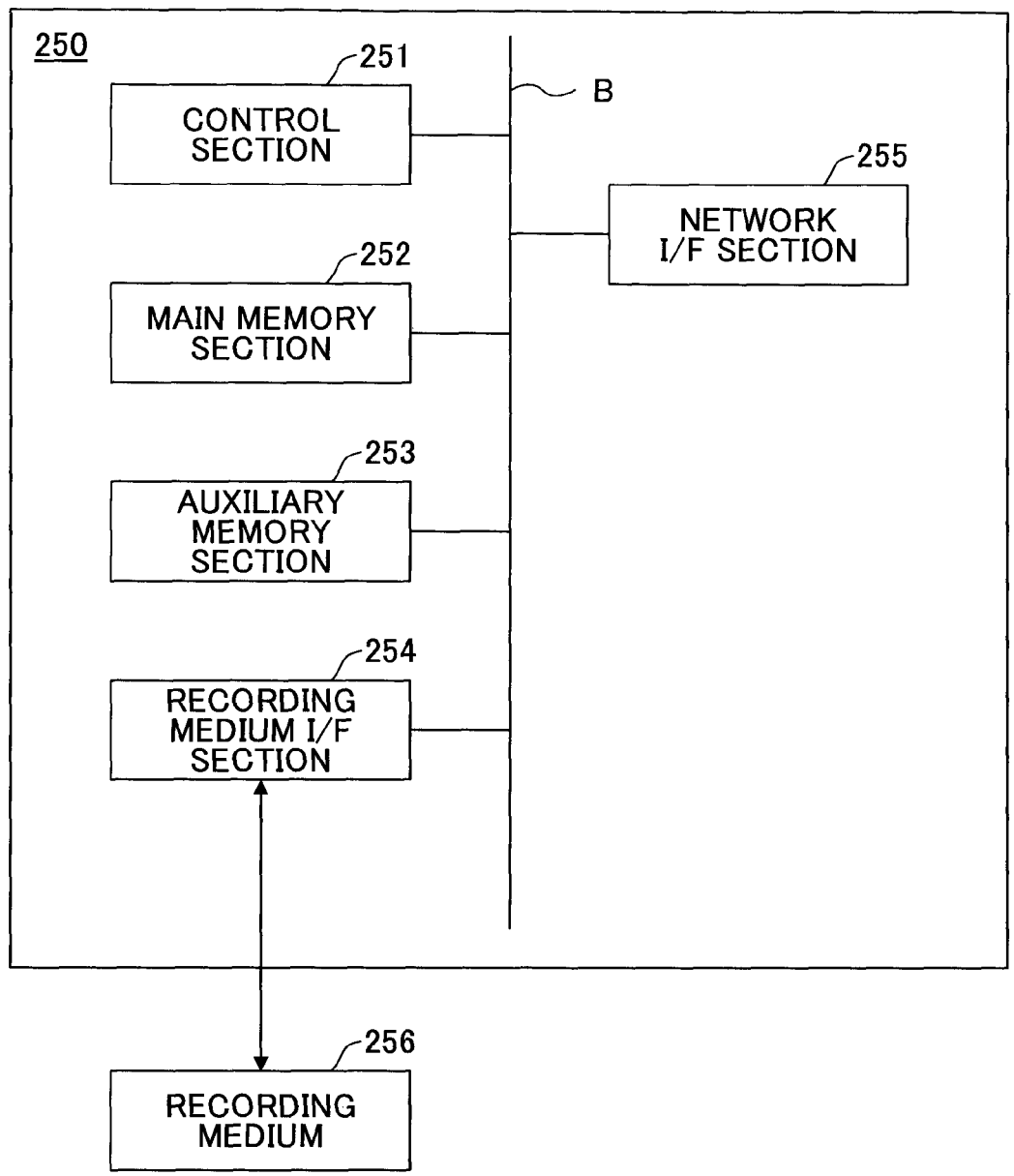
FIG. 17 is a drawing illustrating an example hardware configuration of a server apparatus according to the second embodiment.

FIG. 17 illustrates an example hardware configuration of the image processing server 250. In this embodiment, it is assumed that the image processing server 270 has the same hardware configuration as that of the image processing server 250. However, the image processing server 270 may have a hardware configuration different from that of the image processing server 250.

As illustrated in FIG. 17, the image processing server 250 includes a control section 251, a main memory section 252, an auxiliary memory section 253, a recording medium I/F section 254, and a network I/F section 255.

The control section 251 is a CPU that controls devices and performs calculations and processing on data. Further, the control section 251 is an arithmetic device that executes a program stored in the main memory section 252, so as to receive data from an input device or a storage device, calculate and perform a process on the data, and output the calculated and processed data to an output device, a storage device, etc.

The main memory section 252 is a Read Only Memory (ROM) and a Random Access Memory (RAM) or the like serving as a storage device that stores or temporarily stores data and programs that are executed by the control section 251, the programs including an Operating System (OS), application software programs, etc.

The auxiliary memory section 253 is an HDD or the like serving as a storage device storing data related to the application software programs.

The recording medium I/F section 254 is an interface between the image processing server 250 and a recording medium 256 such as, for example, a flash memory that is connected to the image processing server 250 via a data transmission path such as USB or the like. Further, a program stored in the recording medium 256 is installed into the image processing server 250 via the recording medium I/F section 254 so as to be executed by the control section 251.

The network I/F section 255 is an interface between the image processing server 250 and a peripheral device connected to the image processing server 250 via a network such as a LAN, a WAN or the like that is formed of wireless and/or wired data transmission paths. Further, in the example configuration of FIG. 17, neither an operation section such as a keyboard nor an display section such as an LCD is displayed. However, the image processing server 250 may include those sections.

The hardware configuration of the information processing terminal 290 is the same as that of the image processing apparatus 100 according to the first embodiment.

Functions of the Image Processing System

Figure 18:
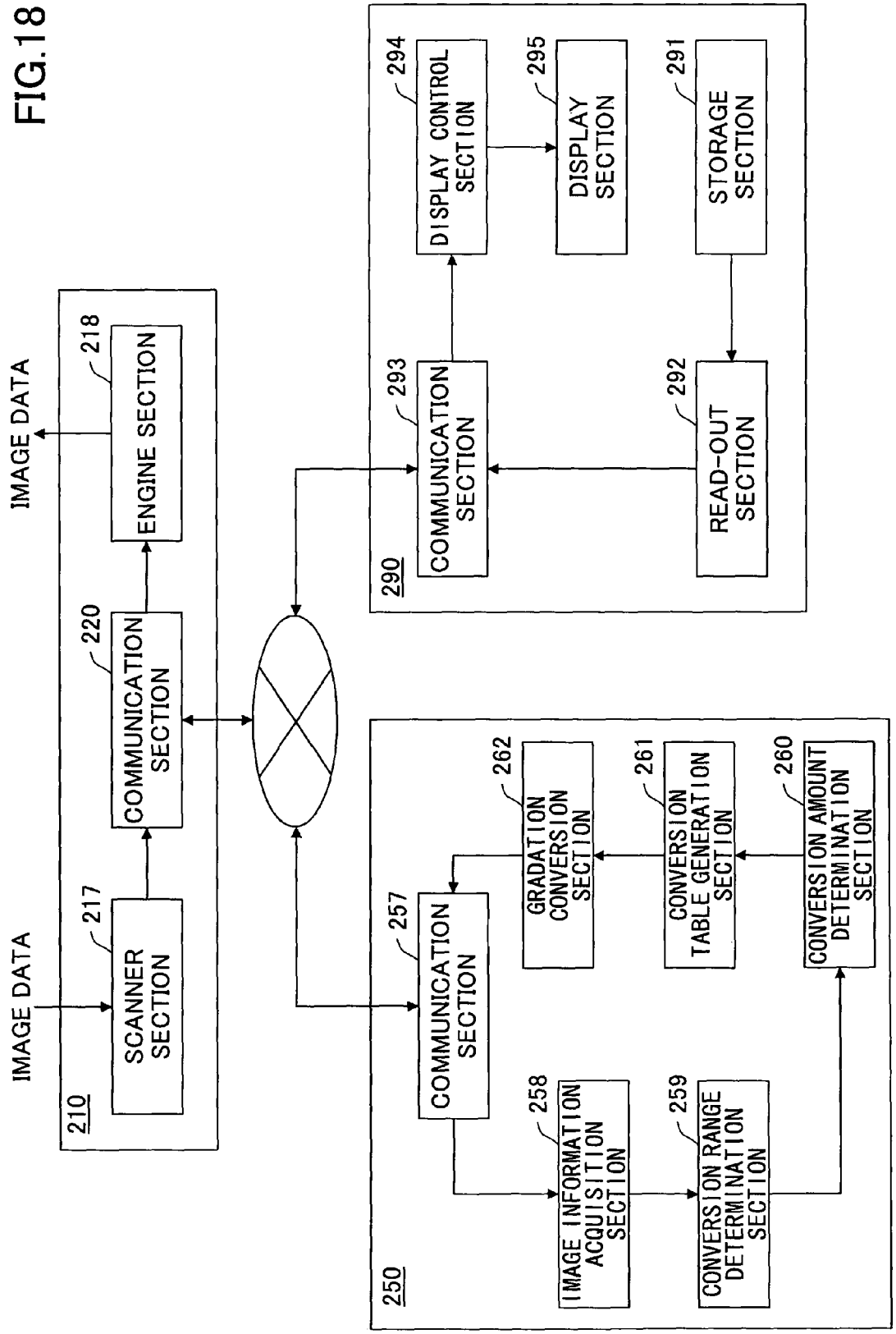
FIG. 18 is a drawing illustrating an example functional configuration of an image processing system according to the second embodiment.

FIG. 18 illustrates an example functional configuration of the image processing system 200 according to the second embodiment of the present invention. Although FIG. 18 illustrates the functional configurations of the MFP 210, the image processing server 250, and the information processing terminal 290, it is herein assumed that the MFP 230 has the same functional configuration as that of the MFP 210 and the image processing server 270 has the same functional configuration as that of the image processing server 250.

The MFP 210 includes the scanner section 217, the engine section 218, and a communication section 220. The scanner section 217 scans a sheet medium or the like so as to acquire image data on which image processing is to be performed. The communication section 220 transmits the image data, which is acquired by the scanner section 217, to the image processing server 250. The communication section 220 receives image data on which the image processing is performed by the image processing server 250. The engine section 218 prints and outputs the image data on which image processing is performed by the image processing server 250 or the like onto a recording medium such as a recording sheet or the like.

The information processing terminal 290 includes a storage section 291, a read-out section 292, a communication section 293, a display control section 294, and a display section 295.

The storage section 291 stores, for example, the conversion information for acquiring the conversion threshold value from the average brightness to be used for the image processing in the image processing server 250. The read-out section 292 reads out the image data and the conversion information from the storage section 291.

The communication section 293 transmits the image data and the conversion information, which are read out by the read-out section 292, to the MFP 210 or the image processing server 250. Further, the communication section 293 receives the image data, the image information and the like which are transmitted from the MFP 210 or the image processing server 250.

The display control section 294 controls the display section 295 to display the image of the image data, which are received by the communication section 293, on the display section 295. Further, the display control section 294 can display the image of the image data, which are stored in the information processing terminal 290, on the display section 295.

The display section 295 is, for example, a liquid crystal or organic EL display to display an image, operational icons, etc.

The image processing server 250 includes a communication section 257, an image information acquisition section 258, a conversion range determination section 259, a conversion amount determination section 260, a conversion table generation section 261, and a gradation conversion section 262. The functions of the sections are the same as those of the corresponding sections in the image processing apparatus 100 according to the first embodiment.

In such a configuration as described above, an operator can acquire the image data, on which the imaging process is to be performed, from the scanner section 217 of the MFP 210 and perform the image processing using the image processing server 250. Otherwise, the operator may acquire the image data from the storage section 291 of the information processing terminal 290 or an external device connected via a network and perform the image processing using the image processing server 250.

In the image processing server 250, the image information acquisition section 258 acquires the average brightness and the RGB cumulative frequency distributions of the RGB gradation values of the image data. The conversion range determination section 259 determines the RGB gradation conversion ranges based on the conversion information and the like read out from the information processing terminal 290. Further, the conversion amount determination section 260 determines the RGB gradation conversion amounts based on the respective RGB gradation conversion ranges. Further, the conversion table generation section 261 generates the RGB gradation conversion tables. Further, the gradation conversion section 262 performs the RGB gradation conversion based on the RGB gradation conversion tables. By doing this, the image processing is performed on the input image data.

The image of the image data on which the image processing is performed may be printed by the engine section 218 of the MFP 210. Further, the image of the image data on which the image processing is performed may be displayed on the display section 295 of the information processing terminal 290. Therefore, the operator may acquire the output of the image processing result by any of those methods.

As described above, In the image processing system 200 according to the second embodiment, an operator who will perform the image processing can acquire the image data, on which the image processing is to be performed, from the MFP 210 or the like and perform the image processing using the image processing server 250 and the information processing terminal 290. In this case, it is no longer necessary for the operator to designate the area on which the image processing is to be performed and operate to set the gradation conversion amount and the like. Therefore, it becomes possible to easily perform the image processing to emphasize or reduce the shine appearance in the shine area of the image data with reduced workload.

Further, the functions of the image processing server 250 may be provided in the information processing terminal 290 or the MFP 210, so that the information processing terminal 290 or the MFP 210 can perform the image processing on the image data. Further, the storage section 291 and the read-out section 292 of the information processing terminal 290 may be provided in the MFP 210 and the image processing server 250, so that the MFP 210 and the image processing server 250 can perform the image processing on the image data.

In the above descriptions, embodiments of the present invention are described. The image processing function included in the image processing apparatus 100 or the image processing system 200 can be realized by causing the computer to execute the processing steps described above using a coded program described in a programming language.

The program that realizes the image processing apparatus 100 or the image processing system 200 according to the embodiment described above may be stored into a computer-readable recording medium. The program according to the embodiment can be installed into the image processing apparatus 100, the image processing servers 250, etc., from a recording medium such as a floppy (registered trademark) disk, a Compact Disc (CD), or a Digital Versatile Disk (DVD) storing the program according to the embodiment. Further, the image processing apparatus 100, the image processing servers 250, etc., include the network I/F section thereof. Therefore, the program according to the embodiment may be downloaded via an electric communication line of the Internet and installed into the image processing apparatus 100, the image processing servers 250, etc.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2013-217517 filed Oct. 18, 2013, the entire contents of which are hereby incorporated herein by reference.

DESCRIPTION OF THE REFERENCE NUMERALS

10,20: IMAGE DATA
100: IMAGE PROCESSING APPARATUS
108,256: RECORDING MEDIUM
111: IMAGE INFORMATION ACQUISITION SECTION
114: CONVERSION AMOUNT DETERMINATION SECTION
115: CONVERSION TABLE GENERATION SECTION
116: GRADATION CONVERSION SECTION
200: IMAGE PROCESSING SYSTEM
250,270: IMAGE PROCESSING SERVER (INFORMATION PROCESSING APPARATUS)
290: INFORMATION PROCESSING TERMINAL

PRIOR ART DOCUMENTS

Patent Document

[Patent Document 1] Japanese Laid-open Patent Publication No. 2005-10902

The invention claimed is:
1. An image processing apparatus comprising:
a storage configured to store a program; and
a processor configured to execute the program and perform a process including
acquiring an average brightness of image data and a cumulative frequency distribution of pixels related to a gradation of the image data;
acquiring a conversion threshold value from the average brightness based on a set relationship, to determine a gradation conversion range in which the gradation of the image data is to be converted based on the gradation at which a cumulative frequency corresponds to the conversion threshold value in the cumulative frequency distribution;
converting the gradation of the image data in the gradation conversion range so that the gradation of the image data is increased by making an output gradation value greater than an input gradation value and a difference between the output gradation value and the input gradation value equal to a gradation conversion amount at a center of the gradation conversion range, to emphasize a shine appearance of the image data, and decreased by making the output gradation value less than the input gradation value and the difference between the output gradation value and the input gradation value equal to the gradation conversion amount at the center of the gradation conversion range, to reduce the shine appearance of the image data; and
outputting the image data having the gradation converted by the converting in the gradation conversion range to a device to be printed or displayed,
wherein the converting converts the gradation of the image data in a range other than the gradation conversion range so that the gradation of the image data remains unchanged.

2. The image processing apparatus according to claim 1, wherein the processor performs the process further including
determining the gradation conversion amount in the gradation conversion range based on a size of the gradation conversion range.

3. The image processing apparatus according to claim 2, wherein the processor performs the process further including
generating a conversion table indicating a relationship between the input gradation value and the output gradation value of the image data based on the gradation conversion range and the gradation conversion amount,
wherein the converting converts the gradation of the image data in the gradation conversion range based on the conversion table.

4. The image processing apparatus according to claim 3, wherein the generating generates the conversion table in which the output gradation value of the image data continuously increases as the input gradation value of the image data increases.

5. The image processing apparatus according to claim 1, wherein gradation conversion ranges determined by the set relationship are substantially same regardless of a number of pixels on a high-brightness side of the image data.

6. An image processing method comprising:
acquiring, by a computer, an average brightness of image data and a cumulative frequency distribution of pixels related to a gradation of the image data;
acquiring, by the computer, a conversion threshold value from the average brightness based on a previously set relationship to determine a gradation conversion range in which the gradation of the image data is to be converted based on the gradation at which a cumulative frequency corresponds to the conversion threshold value in the cumulative frequency distribution;
converting, by the computer, the gradation of the image data in the gradation conversion range so that the gradation of the image data is increased by making an output gradation value greater than an input gradation value and a difference between the output gradation value and the input gradation value equal to a gradation conversion amount at a center of the gradation conversion range, to emphasize a shine appearance of the image data, and decreased by making the output gradation value less than the input gradation value and the difference between the output gradation value and the input gradation value equal to the gradation conversion amount at the center of the gradation conversion range, to reduce the shine appearance of the image data; and
outputting, by the computer, the image data having the gradation converted by the converting in the gradation conversion range to a device to be printed or displayed,
wherein the converting converts the gradation of the image data in a range other than the gradation conversion range so that the gradation of the image data remains unchanged.

7. A non-transitory computer-readable recording medium storing a computer-readable program for causing a computer to execute the image processing method according to claim 6.

8. An image processing system comprising:
a first apparatus; and
a second apparatus communicable with the first apparatus via a network,
wherein the first apparatus comprises a storage configured to store a program, and a processor configured to execute the program and perform a process including
acquiring an average brightness of image data and a cumulative frequency distribution of pixels related to a gradation of the image data;
acquiring a conversion threshold value from the average brightness based on a set relationship, to determine a gradation conversion range in which the gradation of the image data is to be converted based on the gradation at which a cumulative frequency corresponds to the conversion threshold value in the cumulative frequency distribution;
converting the gradation of the image data in the gradation conversion range so that the gradation of the image data is increased by making an output gradation value greater than an input gradation value and a difference between the output gradation value and the input gradation value equal to a gradation conversion amount at a center of the gradation conversion range, to emphasize a shine appearance of the image data, and decreased by making the output gradation value less than the input gradation value and the difference between the output gradation value and the input gradation value equal to the gradation conversion amount at the center of the gradation conversion range, to reduce the shine appearance of the image data; and
outputting the image data having the gradation converted by the converting in the gradation conversion range to a device to be printed or displayed,
wherein the converting converts the gradation of the image data in a range other than the gradation conversion range so that the gradation of the image data remains unchanged.

9. The image processing system according to claim 8, wherein the processor of the first apparatus performs the process further including
determining the gradation conversion amount in the gradation conversion range based on a size of the gradation conversion range.

10. The image processing system according to claim 9, wherein the processor of the first apparatus performs the process further including
generating a conversion table indicating a relationship between an input gradation value and an output gradation value of the image data based on the gradation conversion range and the gradation conversion amount,
wherein the converting converts the gradation of the image data in the gradation conversion range based on the conversion table.

11. The image processing system according to claim 10, wherein the generating generates the conversion table in which the output gradation value of the image data continuously increases as the input gradation value of the image data increases.

12. The image processing system according to claim 8, wherein the first apparatus is one of an image processing server and an information processing terminal that includes the device, and the second apparatus is the other of the image processing server and the information processing terminal.

13. The image processing system according to claim 12, wherein the acquiring the average brightness acquires the image data from the information processing terminal, and the image data having the gradation converted by the converting is output to the device of the information processing terminal.

14. The image processing system according to claim 8, wherein the first apparatus is one of an image processing server and an apparatus that includes the device having at least one of a scanner function, a facsimile function, a copy function, and a printer function, and the second apparatus is the other of the image processing server and the apparatus that includes the device.

15. The image processing system according to claim 14, wherein the acquiring the average brightness acquires the image data from the apparatus that includes the device, and the image data having the gradation converted by the converting is output to the device of the apparatus.

16. The image processing system according to claim 8, further comprising:
   a third apparatus including the device having at least one of a scanner function, a facsimile function, a copy function, and a printer function,
   wherein the third apparatus is communicable with at least one of the first apparatus and the second apparatus via the network.

17. The image processing system according to claim 16, wherein the first apparatus is an image processing server and the second apparatus is an information processing terminal, and the acquiring the average brightness acquires the image data from the device of the third apparatus, and the image data having the gradation converted by the converting is output to the device of the third apparatus.

18. The image processing system according to claim 8, wherein gradation conversion ranges determined by the set relationship are substantially same regardless of a number of pixels on a high-brightness side of the image data.

\* \* \* \* \*